United States Patent
Forni et al.

(10) Patent No.: US 9,611,852 B2
(45) Date of Patent: Apr. 4, 2017

(54) THERMAL/NOISE MANAGEMENT IN A SCROLL PUMP

(71) Applicant: AGILENT TECHNOLOGIES, INC., Loveland, CO (US)

(72) Inventors: Ronald J. Forni, Lexington, MA (US); Scott Driscoll, Lowell, MA (US); George Galica, Worcester, MA (US)

(73) Assignee: Agilent Technology, Inc., Santa Clara, CA (US)

(*) Notice: Subject to any disclaimer, the term of this patent is extended or adjusted under 35 U.S.C. 154(b) by 549 days.

(21) Appl. No.: 13/853,655

(22) Filed: Mar. 29, 2013

(65) Prior Publication Data

US 2014/0294623 A1 Oct. 2, 2014

(51) Int. Cl.

| F04C 29/04 | (2006.01) |
|---|---|
| F04C 18/02 | (2006.01) |
| F01C 21/10 | (2006.01) |
| F04D 19/00 | (2006.01) |
| F04D 25/08 | (2006.01) |
| F04D 27/00 | (2006.01) |

(52) U.S. Cl.
CPC ............. *F04C 29/04* (2013.01); *F01C 21/10* (2013.01); *F04C 18/0215* (2013.01); *F04C 29/045* (2013.01); *F04D 19/002* (2013.01); *F04D 25/08* (2013.01); *F04D 27/004* (2013.01)

(58) Field of Classification Search
CPC ...... F04C 2/025; F04C 15/0096; F04C 29/04; F04C 29/042; F04C 29/045; F04C 29/047; F04C 18/0215; F04C 18/0261; F04C 23/008; F04C 1/0125; F04C 21/06; F01C 1/0125; F01C 21/06

USPC ............ 417/372, 410.3, 410.5; 418/15, 55.1, 418/55.4, 55.6, 85, 92, 101
See application file for complete search history.

(56) References Cited

U.S. PATENT DOCUMENTS

| 3,644,067 A * | 2/1972 | Yowell .................... F04D 13/06 417/370 |
|---|---|---|
| 4,676,473 A | 6/1987 | Giles |
| 5,417,554 A * | 5/1995 | Kietzman ............... F04C 29/04 418/101 |
| 5,467,111 A | 11/1995 | Furukawa et al. |
| 5,653,125 A * | 8/1997 | Boyanich ................ F04B 39/06 417/372 |
| 5,957,667 A * | 9/1999 | Epp ........................ F04B 35/04 417/271 |

(Continued)

FOREIGN PATENT DOCUMENTS

WO   WO2009105627   8/2009

OTHER PUBLICATIONS

Search Report mailed Oct. 14, 2014 in Application No. GB1403289.0.

*Primary Examiner* — Alexander Comley

(57) ABSTRACT

The main sources of heat in a scroll pump are cooled efficiently by a single cooling fan so that noise and, in particular, fan-generated noise, can be kept low. The scroll pump includes a pump head assembly, a pump motor, a cooling fan that produces a cooling air flow in the pump, a cowling in which the pump head assembly, pump motor and cooling fan are housed and juxtaposed with one another in an axial direction of the pump, and a shroud disposed within the cowling and extending around the pump motor to define a tunnel with the motor and through which the air flow of the cooling fan is directed.

17 Claims, 6 Drawing Sheets

(56) References Cited

U.S. PATENT DOCUMENTS

| | | | | |
|---|---|---|---|---|
| 6,093,005 A * | 7/2000 | Nakamura | F01C 1/023 | 418/101 |
| 6,190,145 B1 * | 2/2001 | Fujioka | F04C 29/04 | 417/371 |
| 6,321,563 B1 * | 11/2001 | Ikeda | F04B 49/06 | 184/6.16 |
| 7,387,503 B2 * | 6/2008 | Toda | F04C 18/0223 | 165/80.3 |
| 7,398,855 B2 | 7/2008 | Seel | | |
| 7,442,016 B2 | 10/2008 | Dovey et al. | | |
| 7,583,043 B2 | 9/2009 | Chung et al. | | |
| 7,753,996 B1 | 7/2010 | Deane et al. | | |
| 8,177,534 B2 | 5/2012 | Ni | | |
| 8,562,317 B2 * | 10/2013 | Fujioka | F01C 1/0215 | 418/101 |
| 2002/0039534 A1 * | 4/2002 | Moroi | F04C 29/045 | 417/372 |
| 2004/0109772 A1 * | 6/2004 | Ogawa | F01C 21/10 | 417/410.5 |
| 2004/0241030 A1 * | 12/2004 | Matsushima | F04C 29/04 | 418/60 |
| 2005/0169788 A1 * | 8/2005 | Komai | F01C 21/10 | 418/55.6 |
| 2007/0077159 A1 * | 4/2007 | Tsuchiya | F01C 1/0215 | 418/55.1 |
| 2007/0178001 A1 * | 8/2007 | Minekawa | F04C 29/04 | 418/55.1 |
| 2008/0145258 A1 * | 6/2008 | Metzger | F04C 29/04 | 418/88 |
| 2008/0152525 A1 * | 6/2008 | Tsuchiya | F04C 29/04 | 418/55.1 |
| 2009/0087331 A1 * | 4/2009 | Komai | F01C 1/0246 | 418/55.1 |
| 2009/0269220 A1 * | 10/2009 | Nakagawa | F04C 18/3446 | 417/366 |
| 2010/0111740 A1 * | 5/2010 | Ni | F04C 18/0253 | 418/55.2 |
| 2010/0221134 A1 | 9/2010 | Kanaizumi et al. | | |
| 2010/0223947 A1 * | 9/2010 | Shibuya | B60H 1/3223 | 62/323.3 |
| 2012/0315165 A1 * | 12/2012 | Dreifert | F04C 29/047 | 417/410.1 |
| 2012/0315174 A1 * | 12/2012 | Iwano | F04C 27/005 | 418/55.4 |

* cited by examiner

THERMAL/NOISE MANAGEMENT IN A SCROLL PUMP

BACKGROUND OF THE INVENTION

1. Field of the Invention

The present invention relates to a scroll pump having a pump head assembly that includes a stationary plate scroll and an orbiting plate scroll, a pump motor coupled to the orbiting plate scroll so as to drive the orbiting plate scroll, and means for cooling one or more components of the pump. In particular, the present invention relates to a method of and means for regulating the temperature of components of a scroll pump.

2. Description of the Related Art

A scroll pump is a type of pump that includes a stationary plate scroll having a stationary plate and a spiral stationary scroll blade projecting axially therefrom, and an orbiting plate scroll having an orbiting plate and a spiral orbiting scroll blade projecting axially therefrom. The stationary and orbiting scroll blades are nested with a clearance and predetermined relative angular positioning, and a seal is provided between the tip (free end) of the scroll blade of one (or both of) the plate scrolls and the plate (or plates of) the other plate scroll such that a pocket (or pockets) is delimited by and between the stationary and orbiting scroll blades. The stationary plate scroll is fixed in the pump. The orbiting plate scroll and hence, the orbiting scroll blade, is coupled to an eccentric driving mechanism. The stationary and orbiting plate scrolls and the eccentric drive mechanism may make up what is referred to as a pump head or pump head assembly.

The eccentric drive mechanism is, in turn, connected to and driven by a motor of the pump such that the orbiting scroll plate orbits about a longitudinal axis of the pump passing through an axially central portion of the stationary scroll blade. The volume of the pocket(s) delimited by the scroll blades of the pump is varied as the orbiting scroll blade moves relative to the stationary scroll blade. The orbiting motion of the orbiting scroll blade also causes the pocket(s) to move within the pump head assembly such that the pocket(s) is selectively placed in open communication with an inlet and outlet of the scroll pump.

In an example of such a scroll pump, the motion of the orbiting scroll blade relative to the stationary scroll blade causes a pocket sealed off from the outlet of the pump and in open communication with the inlet of the pump to expand. Accordingly, fluid is drawn into the pocket through the inlet. Then the pocket is moved to a position at which it is sealed off from the inlet of the pump and is in open communication with the outlet of the pump, and at the same time the pocket is compressed. Thus, the fluid in the pocket is compressed and thereby discharged through the outlet of the pump.

In the case of a vacuum-type of scroll pump, the inlet of the pump is connected to a chamber that is to be evacuated. Conversely, in the case of a compressor-type of scroll pump, the outlet of the pump is connected to a chamber that is to be supplied with pressurized fluid by the pump. In either case, various components of the pump produce significant amounts of heat which may reduce the useful life of the components or worse, cause an operational failure of the pump.

Therefore, scroll pumps are provided with one or more cooling fans to cool the pump. However, the fan(s) may be a significant source of noise which is detrimental in the workplace.

SUMMARY OF THE INVENTION

It is a general object of the present invention to provide a scroll pump in which the main sources of heat in the pump can be cooled effectively.

It is a more specific object of the present invention to provide a scroll pump in which a single and relatively compact cooling fan can effectively cool the entire pump, including in a case in which major sources of heat in the pump are at opposite ends of the pump.

According to an aspect of the present invention, there is provided a scroll pump including a pump head assembly, a pump motor, a cooling fan that produces a cooling air flow in the pump, a cowling in which the pump head assembly, pump motor and cooling fan are housed and juxtaposed with one another in an axial direction of the pump, and a shroud disposed within the cowling and extending around the pump motor. The pump head assembly has a stationary plate scroll fixed in the pump, an orbiting plate scroll, and a drive shaft coupling the pump motor to the orbiting plate scroll. The pump motor is coupled to the orbiting plate scroll so as to drive the orbiting plate scroll.

The cowling has opposite ends in the axial direction of the pump. The ends of the cowling define an air inlet and an air outlet, respectively. The shroud extends around the pump motor as spaced radially therefrom such that a tunnel extending longitudinally in the axial direction of the pump is defined by the shroud between the pump motor and the shroud within the cowling. The tunnel is open to and connects the air inlet and the air outlet, and the cooling fan is disposed in the pump such that the cooling air flow produced by the cooling fan flows from the air inlet to the air outlet via the tunnel to cool the pump motor.

BRIEF DESCRIPTION OF THE DRAWINGS

These and other objects, features and advantages of the present invention will be better understood from the detailed description of the preferred embodiments thereof that follows with reference to the accompanying drawings, in which.

DETAILED DESCRIPTION OF THE PREFERRED EMBODIMENTS

Figure 1:
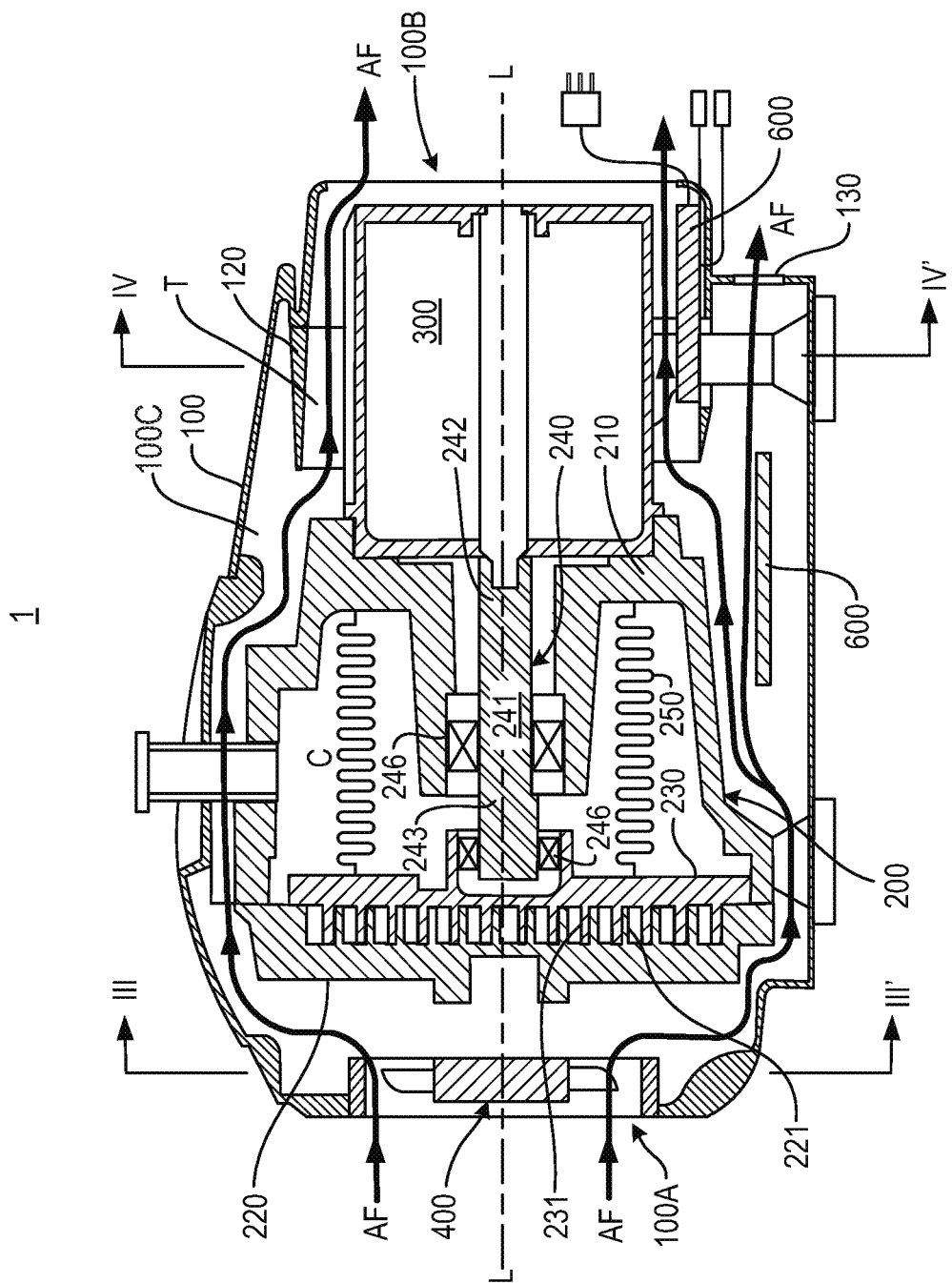
FIG. 1 is a schematic longitudinal sectional view of a simplified version of a scroll pump according to the present invention.

Various embodiments and examples of embodiments of the inventive concept will be described more fully hereinafter with reference to the accompanying drawings. In the drawings, the sizes and relative sizes of elements may be exaggerated for clarity. Likewise, the shapes of elements may be exaggerated and/or simplified for clarity and ease of understanding. Also, like numerals and reference characters are used to designate like elements throughout the drawings.

Furthermore, spatially relative terms, such as "front" and "back" are used to describe an element's relationship to another element(s) as illustrated in the figures. Thus, the spatially relative terms may apply to orientations in use which differ from the orientation depicted in the figures. Obviously, though, all such spatially relative terms refer to the orientation shown in the drawings for ease of description and are not necessarily limiting as apparatus according to the invention can assume orientations different than those illustrated in the drawings when in use.

Other terminology used herein for the purpose of describing particular examples or embodiments of the inventive concept is to be taken in context. For example, the terms "comprises" or "comprising" when used in this specification indicates the presence of stated features or processes but does not preclude the presence of additional features or processes. The term "pump" may refer to apparatus that drives, or raises or decreases the pressure of a fluid, etc. The term "fixed" may be used to describe a direct connection of two parts to one another in such a way that the parts can not move relative to one another or a connection of the parts through the intermediary of one or more additional parts in such a way that the parts can not move relative to each other.

Referring now to FIG. 1, a scroll pump 1 to which the present invention may be applied includes a cowling 100, and a pump head assembly 200, a pump motor 300, and a cooling fan 400 housed in the cowling 100. More specifically, the pump head assembly 200, pump motor 300 which may be an electric motor, an air motor, or other suitable type of motor, and cooling fan 400 are juxtaposed with one another along a longitudinal axis L of the pump 1, i.e., in an axial direction of the pump 1. Furthermore, the cowling 100 has opposite ends in the axial direction. The ends of the cowling 1 define an air inlet 100A and an air outlet 100B, respectively. The air outlet 100B may be in the form of a grill.

The pump head assembly 200 includes a frame 210, a stationary plate scroll 220, an orbiting plate scroll 230, an eccentric drive mechanism 240, an annular metallic bellows 250 and fasteners (not shown) fixing the stationary plate scroll 220 to the frame 210 and the metallic bellows 250 to both the frame 210 and the orbiting plate scroll 230.

Figure 2:
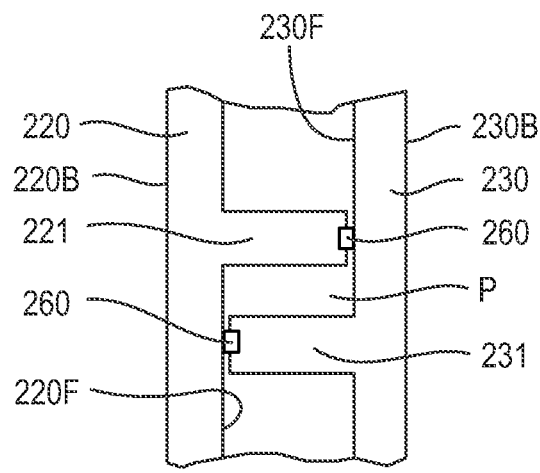
FIG. 2 is a schematic enlarged longitudinal sectional view of portions of the stationary and orbiting scroll blades of the scroll pump.

Furthermore, and with reference to FIG. 1 and FIG. 2, the stationary plate scroll 220 has a front side 220F and a back side 220B, and comprises a stationary scroll blade 221 at its front side 220F. The orbiting plate scroll 230 has a front side 230F and a back side 230B, and comprises an orbiting scroll blade 231 at its front side 230F. The stationary scroll blade 221 and the orbiting scroll blade 231 are nested with a clearance and predetermined relative angular positioning such that a pocket P or pockets is/are delimited by and between the stationary and orbiting scroll blades. In this respect, side surfaces of the scroll blades 221 and 231 need not contact each other to seal the pocket(s). Rather, minute clearances between side surfaces of the scroll blades 221 and 231 may create a seal sufficient for forming a satisfactory pocket(s).

On the other hand, in this example, a tip seal 260 is interposed between and disposed in contact with an axial (tip) end of the orbiting scroll blade 231 and the plate of the stationary plate scroll 220, at the front side 220F of the stationary plate scroll 220, to create a first axial seal which maintains the pocket(s) between the stationary and orbiting plate scroll blades 221 and 231. A second tip seal 260 is interposed between and disposed in contact with an axial (tip) end of the fixed scroll blade 221 and the plate of the orbiting plate scroll 230, at the front side 230F of the orbiting plate scroll 230, to create a second axial seal which maintains the pocket(s) between the stationary and orbiting plate scroll blades 221 and 231. Each tip seal 260 is a plastic member seated in a spiral groove in the tip of the scroll blade, i.e., a groove extending along the length of the scroll blade in the tip thereof.

The eccentric drive mechanism 240 includes a drive shaft 241 and bearings 246. In this example, the drive shaft 241 is a crank shaft having a main portion 242 coupled to the motor 300 so as to be rotated by the motor about a longitudinal axis L of the pump 1, and a crank 243 whose central longitudinal axis is offset in a radial direction from the longitudinal axis. The bearings 246 comprise a plurality of sets of rolling elements.

Also, in this example, the main portion 242 of the crank shaft is supported by the frame 210 via one or more sets of the bearings 246 so as to be rotatable relative to the frame 210. The orbiting plate scroll 230 is mounted to the crank 243 via another set or sets of the bearings 246. Thus, the orbiting plate scroll 230 is carried by crank 243 so as to orbit about the longitudinal axis of the pump when the main shaft 242 is rotated by the motor 300, and the orbiting plate scroll 230 is supported by the crank so as to be rotatable about the central longitudinal axis of the crank 243.

The metallic bellows 250 has a first end at which the bellows 250 is fixed to the back side 230B of the orbiting plate scroll 230 and a second end at which the bellows 250 is fixed to the frame 210. In this respect, the metallic bellows 250 is radially flexible enough to allow the first end thereof to follow along with the orbiting plate scroll 230 while the second end of the bellows remains fixed to the frame 210. On the other hand, the metallic bellows 250 has a torsional stiffness that prevents the first end of the bellows from rotating significantly about the central longitudinal axis of the bellows, i.e., from rotating significantly in its circumferential direction, while the second end of the bellows remains fixed to the frame 210.

The metallic bellows 250 may be essentially the only means of providing the angular synchronization of the stationary scroll blade 221 and the orbiting scroll blade 231 during the operation of the pump 1. Furthermore, not only does the metallic bellows 250 extend between the frame 210 and the back side 230B of the orbiting plate scroll 230, but the metallic bellows 250 also extends around a portion of the crank shaft 243 and the bearings 246 of the eccentric drive mechanism 240. In this way, the bellows 250 may also seal the bearings 246 and bearing surfaces from a space defined between the bellows 250 and the frame 210 in the radial direction and which space may constitute the working chamber, e.g., a vacuum chamber C of the pump, through which fluid worked by the pump passes. Accordingly, lubricant employed by the bearings 246 and/or particulate matter generated by the bearings surfaces can be prevented from passing into the chamber C by the bellows 250.

The cooling fan 400 is provided as part of a thermal management system to cool sources of heat of the pump. These heat sources include the pump motor 300 and the pump head assembly 200 as will be described in more detail later. Moreover, the levels of the noise and vibration are dependent on the thermal management system given that the cooling fan can be the dominant source of noise, in this respect, the noise of a cooling fan is a strong function of the tip velocity of the fan blades, which is directly proportional to the speed at which the fan is driven and dimensions of the fan such as the diameter of the rotary part of the fan.

A scroll pump according to the present invention is designed to minimize noise in one respect by ensuring that only one relatively compact cooling fan can cool all of the significant sources of heat in the pump. This aspect of the present invention will now be described in more detail.

Referring still to FIG. 1 the pump 1 also includes a shroud 120 disposed within the cowling 100. The shroud 120 extends around the pump motor 300 as spaced radially therefrom such that a tunnel T extending longitudinally in the axial direction of the pump is defined between (the outer peripheral surface of the housing of) the pump motor 300 and (an inner peripheral surface of) the shroud 120 within the cowling 100.

The tunnel T is open to and connects the air inlet 100A and the air outlet 100B, and the cooling fan 400 is disposed in the pump such that the cooling air flow produced by the cooling fan, as shown by the arrows AF, flows from the air inlet 100A to the air outlet 100B via the tunnel T to cool the sources of heat in the pump.

In this respect, the cooling fan 400 is a multi-speed or variable speed fan disposed upstream of the pump head assembly 200 in the pump 1, with respect to the direction of the cooling air flow produced by the fan 400, and the channel 100C (described below) traverses the pump head assembly 200. Therefore, the cooling air flow AF cools the pump head 200 assembly which is the primary source of heat in the pump 1. The cooling fan 400 is also disposed upstream of the pump motor 300 in the pump, with respect to the direction of the cooling air flow produced by the fan 400, and the tunnel T traverses the pump motor 300. Therefore, the cooling air flow AF also cools the motor which is the source of the second largest amount of heat in the pump 1.

In the embodiment of FIG. 1, the cowling 100 defines at least one channel 100C therein that channels the cooling air flow AF in the direction from the air inlet 100A towards the air outlet 100B, a first axial end of the tunnel T is open to and contiguous with the channel 100C, the other axial end of the tunnel T is disposed closer to the air outlet 100B than the first axial end, and the shroud 120 is a solid annular body and is integrated with the cowling 100 such that the channel 100C leads into the tunnel T only via the first axial end of the tunnel T.

Preferably, in this embodiment, the airflow area of the fan 400 is substantially the same as that of the tunnel T. The airflow area is the area of the air flow in a cross section perpendicular to the direction of flow. The airflow area of the fan 400 is the cross-sectional area of the cooling air flow at the location where the cooling air flow exits the fan 400. More specifically, and referring to FIG. 3, the cooling fan 400 has a hub 400A, fan blades 400B radiating from the hub, a housing 400C having an inner surface surrounding tips of the fan blades 400B, and a variable speed fan motor (not shown in the figure) connected to the hub 400A.

Figure 3:
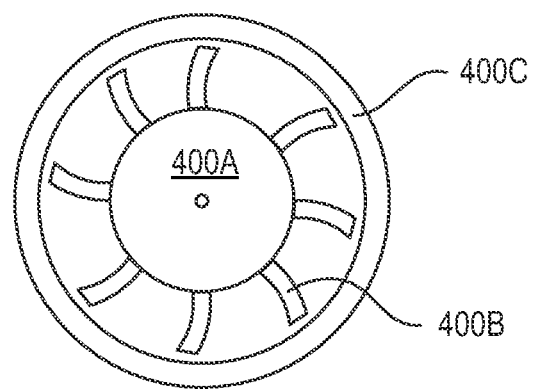
FIG. 3 is a schematic cross-sectional view of a cooling fan of the scroll pump, taken in the direction of line III-III' in FIG. 1.
Figure 4:
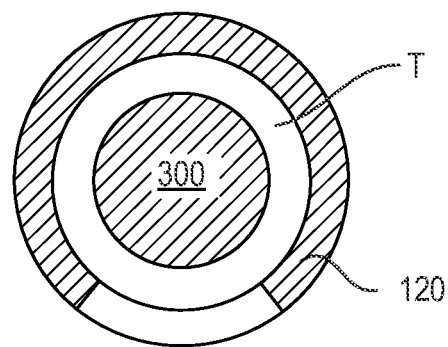
FIG. 4 is a schematic cross-sectional view of a pump motor and shroud of the scroll pump, taken in the direction of line IV-IV' in FIG. 1.

Referring now to FIGS. 3 and 4, the cross-sectional area of the space defined by and between the inner peripheral surface of the fan housing 400C and the outer peripheral space of the fan hub 400A, at the downstream end of the fan housing 400C, is preferably substantially the same as the maximal cross-sectional area of the tunnel T, namely, of the space defined by and between the inner peripheral surface of the shroud 120 and the outer peripheral surface of the pump motor 300. Note, in this respect the inner and outer peripheral surfaces of the shroud 120 and the pump motor 300 may be substantially cylindrical so that the cross-sectional area of the tunnel T is substantially uniform along the entire length of the tunnel T.

However, the airflow area of the tunnel T may be greater or less than that of the fan 400 to optimize the cooling of the pump motor 300. For a given output of the fan 400, the greater the airflow area of the tunnel T becomes, the greater is the volume of air that is displaced through tunnel T per unit time but the lower is the heat transfer coefficient at the boundary between the pump motor 300 and the airflow. The opposite effect occurs the smaller the airflow area of the tunnel T becomes. Preferably, the airflow area of the tunnel T is within a range of 50% to 200% of the airflow area of the fan 400.

Figure 5:
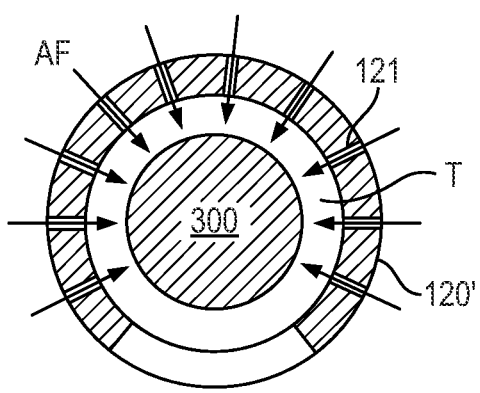
FIG. 5 is a cross-sectional view similar to that of FIG. 4 but of a scroll pump having another form of shroud surrounding the pump motor.

FIG. 5 shows an alternative form of the shroud 120'. Referring to FIGS. 1 and 5, the shroud 120' is an annular body having perforations 121 extending radially therethrough, and the perforations are open to the channel 100C such that the cooling air flow AF produced by the fan 400 flows through the perforations 121 and forms jets of air that impinge (the housing of) the pump motor 300 before flowing to the air outlet 100B. Cooling an object in this way, i.e., by directing jets of air that impinge the surface of the object, provides a cooling method known in the art, per se, as providing one of the highest heat transfer coefficients H. Thus, the perforated shroud 120' of FIG. 5 is very effective at facilitating the cooling of the pump motor 300.

Figure 6:
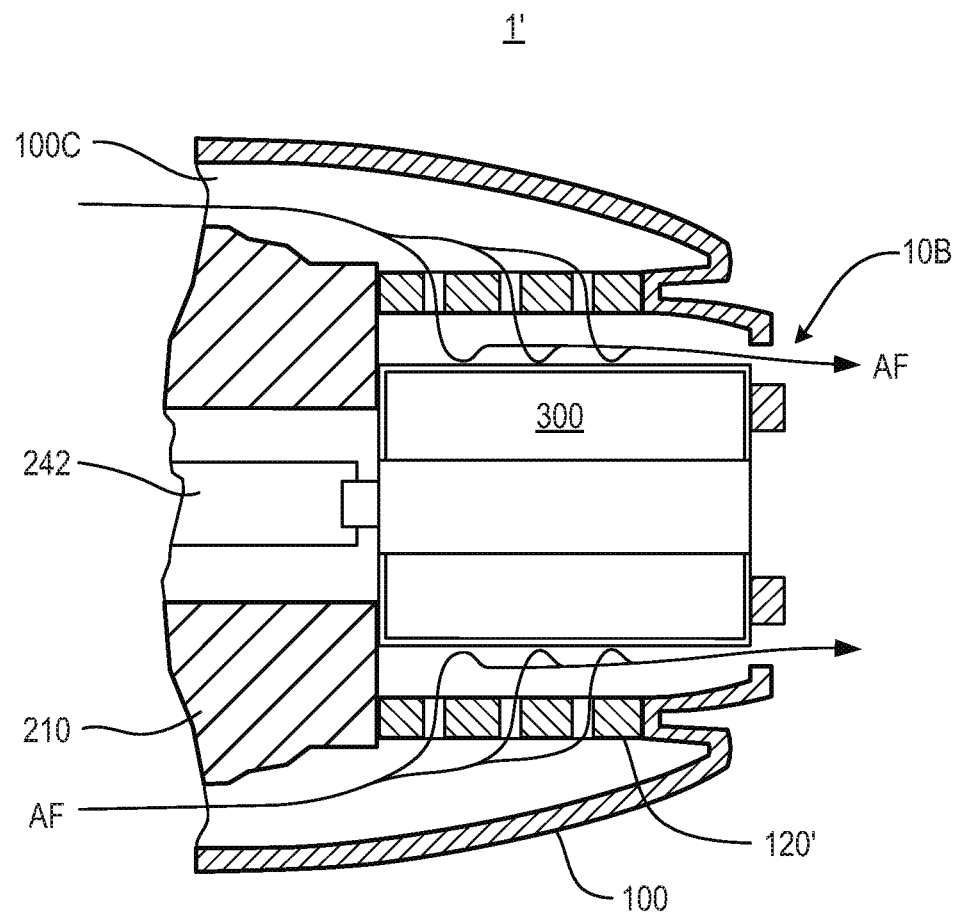
FIG. 6 is a schematic longitudinal sectional view of part of another embodiment of a scroll pump according to the present invention, which comprises a shroud of the type shown in FIG. 5.

Another embodiment of the scroll pump 1' is shown in FIG. 6. This embodiment employs the perforated shroud 120' and is otherwise similar to that of FIG. 1 except that both axial ends of the shroud 120' are sealed with respect to the channel 100C. Therefore, the cooling air flow AF produced by the fan 400 can flow into the tunnel T only through the perforations in the shroud 120'.

A scroll pump according to the present invention is designed to minimize noise in another respect by ensuring that cooling fan is driven at the lowest speed necessary to effectively cool (the heat sources of) the pump. This aspect of the present invention will now be described in more detail.

Figure 7:
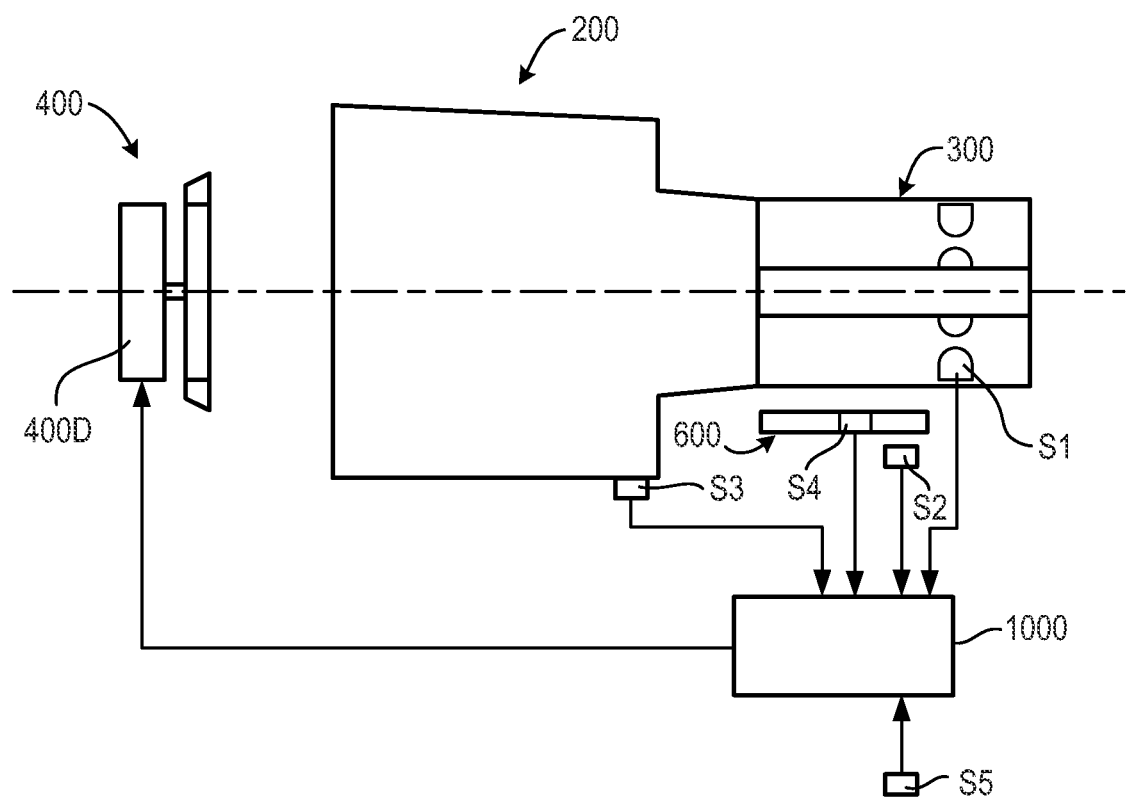
FIG. 7 is a block diagram of the scroll pump according to the present invention.

Referring to FIG. 7, the scroll pump 1 is also provided with an electronic control system that controls the operation of the pump. The electronic control system includes a circuit board 600 that controls the pump motor 300. The control of the pump motor 300 may refer to an operation of starting the motor 300. In the case in which the pump motor 300 is an inverter-controlled motor, the circuit board 600 may be an inverter board having circuitry that inverts the AC or DC voltage provided by the power source for the pump motor 300 to a variable frequency in order to operate the pump over a range of speeds. Such an inverter board is also a source of significant heat in the pump 1. The circuit board 600 may be received in a cut-out in the shroud 120 so as to be exposed to the tunnel T.

In addition to the circuit board 600 or as an alternative, other electronic components of the electronic control system, which are sources of heat in the pump 1, may be exposed to the at least one channel 100C defined by the cowling 100 so that the cooling air flow produced by the fan 400 passes over the electronic components and thereby cools the components before passing into the tunnel T. Therefore, the cooling air flow AF passes over and cools the circuit board 600 before flowing out through the air outlet 100C and/or a second air outlet 130.

For example, a circuit board 600 may be mounted to the base of the pump 1 beneath the pump head assembly 200, and the cowling 100 may have a separate opening 130 (also referred to as a second air outlet or auxiliary outlet) therethrough (FIG. 1) that induces part of the cooling air flow AF to pass over the circuit board 600. Thus, this circuit board 600 is cooled by the airflow AF before the airflow passes into the tunnel T or otherwise out of the pump through the second air outlet 130.

Referring now to FIG. 7, a scroll pump according to the present invention also has at least one sensor that monitors a respective load on the pump. Preferably, the at least one sensor includes a temperature sensor S1 operatively associated with of a winding of the pump motor 300 (in the case in which the pump motor is an electric motor) so as to sense a temperature of the winding. In the above-mentioned case in which the pump motor 300 is an inverter-controlled motor, the at least one sensor also includes a temperature sensor S2 operatively associated with the circuit board 600 (e.g., inverter board or motor start board) of the control system so as to sense a temperature thereof.

The at least one temperature sensor may also include a temperature sensor S3 associated with the pump head assembly 200 so as to sense a temperature of thereof, a sensor S4 operatively associated with the pump motor 300 so as to sense the power being drawn by the pump motor 300, and/or a temperature sensor S5 that senses a temperature of an ambient of the pump. Any type of appropriate temperature and power draw sensors known in the art, per se, may be used.

In addition to the circuit board 600, the electronic control system also has an electronic controller 1000. The controller 1000 is operatively connected to the sensor(s) S1, S2, S3, S4 and/or S5 and to the a variable speed motor 400D of the multi-speed cooling fan 400. The electronic controller 1000 receives signals from the sensor(s) S1, S2, S3, S4 and/or S5 indicative of the load(s) on the pump 1, and has a processor that processes the signals to determine the thermal load on the pump 1, and based on the thermal load, issues a command to the fan motor 400D to drive the fan 400 at the lowest speed necessary to cool the pump 1 sufficiently. As the fan speed is kept to a minimum, so is the noise of the pump 1.

A situation arises, though, when a tip seal 260 (refer back to FIG. 2) is first installed or is replaced as sometimes becomes necessary. The new tip seal 260 creates a relatively large amount of friction with the plate of the opposing scroll plate until the tip seal is worn down a certain amount. Thus, the new tip seal produces a relatively large amount of heat. Note, as is conventional in the art, a dedicated tip seal burnishing operation, in which the pump is run for some period of time without actually being used, is generally performed to wear in a newly installed tip seal.

A method of controlling the speed of the cooling fan 400 to the optimum speed necessary to cool the pump sufficiently to prevent the pump from being damaged, e.g., to prevent the motor or electronic components from overheating, or to prevent the useful life of the parts of the pump from being shortened will now be described with reference to FIGS. 7 and 8.

First (step 10 in FIG. 8), at least one load on the scroll pump is monitored by the at least one sensor (S1, S2 . . . and/or S5) of the electronic control system.

The load(s) being monitored is analyzed (step 20) by the controller 1000. The controller 1000 is configured with an algorithm by which situations resulting in abnormal operating temperatures or motor power draw, including a state of the pump in which a new tip seal has just been installed, can be discriminated in real time. That is, a state of the pump in which a new tip seal has just been installed can be discriminated from operating state(s) of the pump in which the tip seal has already been worn down by a given amount and therefore is not creating as much friction.

In fact, in the present embodiment, controller 1000 is configured with an algorithm by which the following three possible states of the pump can be discriminated from one another based on the analysis of the load(s) on the pump:

State 1: The pump is operating at normal temperatures and power levels;

State 2: The pump is operating in an environment in which the ambient temperature is high or in which the load on the pump created by the fluid being worked by the pump is high; and State 3: The tip seal burnishing operation is taking place.

State 1 requires a medium fan speed to minimize noise. State 2 requires a maximum fan speed to properly cool the pump and components. State 3 requires a low to medium fan speed to minimize pump motor power draw.

Figure 8:
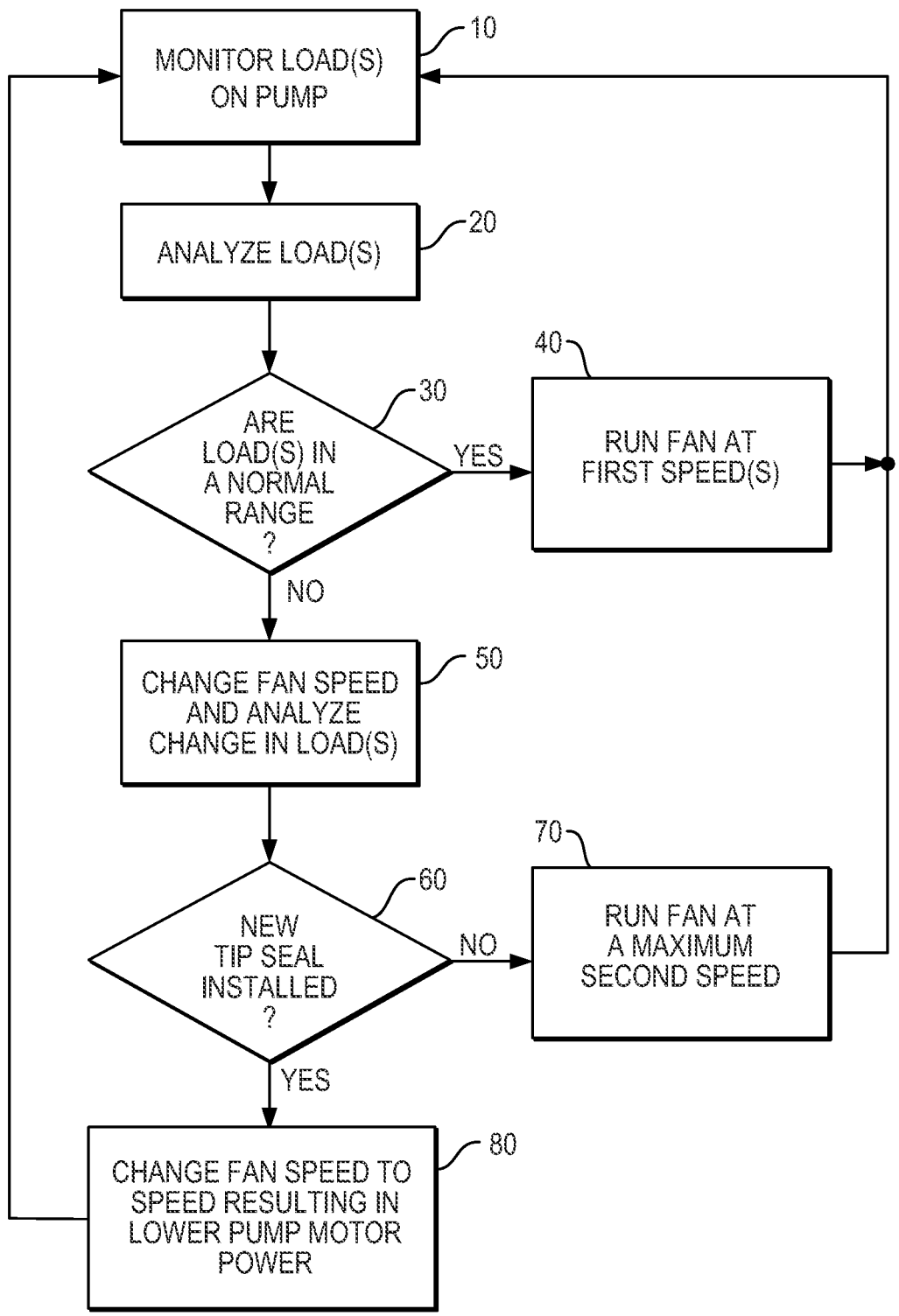
FIG. 8 is a flow chart of a method of thermal management of a scroll pump, according to the present invention.

Referring still to FIGS. 7 and 8, the cooling fan 400 is controlled by the controller 1000 to run at a first speed or speeds within a predetermined range (step 40) as long as the analysis (step 20) indicates that the load(s) on the pump is/are within a normal range and the sensed temperature(s) is/are also normal, i.e., the pump is in State 1. This medium (first) speed or range of speeds is/are selected to minimize fan noise while still providing adequate cooling.

If the pump is operating outside a normal range (NO in step 30) the fan speed is changed (step 50) according to a program and the load(s) on the pump is/are analyzed while the fan 400 is being driven at the new speed. The manner in which the load(s) changes/change as a result of changing the fan speed allows the controller 1000 to determine if a tip seal burnishing operation is in progress.

Basically, if the analysis (step 50) determines that the pump is in State 2, then the cooling fan 400 is controlled by the controller 1000 to run at maximum (second) speed or speeds (step 70) to provide the maximum amount of cooling air and largest heat transfer coefficient. On the other hand, if the pump is operating outside a normal range and the controller 1000 determines that this is due to a tip seal burnishing operation being in progress, then the cooling fan 400 is controlled by the controller 1000 to run at an optimum speed (step 80) for burnishing a new tip seal. This optimum speed (produced when the method proceeds to step 80) is generally below the first speed(s) (produced when the method proceeds to step 40).

The optimum speed of the fan 400 for burnishing a new tip seal is the fan speed which brings the power draw of the pump into a normal range and hence, significantly reduces the heat generation of the motor 300 and pump head 200. When burnishing a new tip seal, operating the fan 400 at a lower speed reduces the thermally induced crush on the tip seal, and hence the friction induced heat generation. In other words when burnishing a new tip seal, a lower fan speed actually results in lower operating temperatures, which is counter intuitive because it would be thought that a higher fan speed would result in lower operating temperatures.

The reason for this is as follows. Although a greater amount of heat is produced by the friction between a new tip seal 260 and the plate against which it is pressed, than by the friction between a worn-in tip seal and the same plate, the present inventors have discovered that the fan 400 keeps the back side 220B of the stationary plate scroll 220 and an outer wall of the frame 210 relatively cool whereas the heat is produced mainly at the front side 220F of the stationary plate scroll 220 and the front side 230F of the orbiting plate scroll 230. This results in a thermal expansion of an inner boss of the frame 210, which extends around the eccentric drive mechanism 240. The thermal expansion, in turn, results in the front side 220F of the stationary plate scroll 220 being brought closer to the orbiting plate scroll 230. Consequently, the clearance provided by the tip seal 260 is reduced and hence, a greater amount of friction and thus more heat is produced. Increasing the speed of the fan 400 at this time only would exacerbate this phenomenon.

Therefore, the controller 1000, through its configuration, recognizes this situation and decreases the speed of the cooling fan 400 to an optimum speed to bring the motor power into a normal range while still providing a level of acceptable air flow.

Finally, embodiments of the inventive concept and examples thereof have been described above in detail. The inventive concept may, however, be embodied in any different forms and should not be construed as being limited to the embodiments described above. Rather, these embodiments were described so that this disclosure is thorough and complete, and fully conveys the inventive concept to those skilled in the art. Thus, the true spirit and scope of the inventive concept is not limited by the embodiment and examples described above but by the following claims.

What is claimed is:

1. A scroll pump comprising:
   a pump motor comprising a pump motor housing, the pump motor housing comprising an outer peripheral surface;
   a pump head assembly comprising a stationary plate scroll fixed in the scroll pump, an orbiting plate scroll, and a drive shaft coupling the pump motor to the orbiting plate scroll;
   a cooling fan that produces a cooling air flow in the scroll pump;
   a cowling in which the pump head assembly, the pump motor and the cooling fan are housed as juxtaposed with one another in an axial direction of the scroll pump, the cowling having opposite axial ends in the axial direction, the axial ends defining an air inlet and an air outlet, respectively; and
   a shroud disposed within the cowling and comprising an inner peripheral surface, the shroud extending around the pump motor and spaced radially therefrom such that a tunnel extending longitudinally in the axial direction of the scroll pump is defined between the outer peripheral surface and the inner peripheral surface, wherein:
   the tunnel is open to and connects the air inlet and the air outlet, and the cooling fan is disposed in the scroll pump such that the cooling air flow produced by the cooling fan flows from the air inlet to the air outlet via the tunnel to cool the pump motor; and
   the cooling fan is housed within the cowling at the air inlet of the cowling, the pump motor is disposed within the cowling adjacent the air outlet of the cowling, the pump head assembly is interposed in the axial direction between the cooling fan and the pump motor, and the shroud has a first axial end disposed adjacent the pump head assembly and a second axial end at which the shroud is integral with the cowling.

2. The scroll pump as claimed in claim 1, wherein the cooling air flow output by the fan has a cross-sectional area, perpendicular to the axial direction, that is substantially the same as that of the tunnel.

3. The scroll pump as claimed in claim 2, wherein the cooling fan has a hub, fan blades radiating from the hub, and a housing having an inner surface surrounding tips of the fan blades, and the cross-sectional area of the cooling air flow is substantially the same as that of a space delimited by and between the hub and the inner surface of the housing of the fan.

4. The scroll pump as claimed in claim 1, wherein the cowling defines at least one channel therein that channels the cooling air flow in a direction from the air inlet towards the air outlet thereof, the tunnel comprises a first axial end and a second axial end, the first axial end of the tunnel is open to and contiguous with the channel, the second axial end of the tunnel is disposed closer to the air outlet than the first axial end of the tunnel, and the shroud is a solid annular body and is integrated with the cowling such that the channel leads into the tunnel only via the first axial end of the tunnel.

5. The scroll pump as claimed in claim 1, wherein the cowling defines at least one channel therein that channels the cooling air flow in a direction from the air inlet towards the air outlet thereof, the shroud is an annular body having perforations extending radially therethrough, and the perforations are open to the channel such that the cooling air flow produced by the fan flows through the perforations and impinges the pump motor before flowing to the air outlet.

6. The scroll pump as claimed in claim 5, the shroud has axial ends that are sealed with respect to the channel such that the cooling air flow produced by the fan can flow into the tunnel only through the perforations in the shroud.

7. The scroll pump as claimed in claim 1, further comprising a circuit board having circuitry that controls an operation of the pump, and wherein the circuit board is disposed in the path of the cooling air flow so as to be cooled by the air flow.

8. The scroll pump as claimed in claim 7, wherein at least part of the circuit board is exposed within the tunnel such that the cooling air flow produced by the fan passes over the circuit board before passing out of the pump through the air outlet.

9. The scroll pump as claimed in claim 8, wherein the circuit board comprises an inverter circuit that converts one AC frequency to another AC frequency.

10. The scroll pump as claimed in claim 7, wherein the cowling defines at least one channel therein that channels the cooling air flow in a direction from the air inlet towards the air outlet thereof, and the circuit board is disposed in the channel such that the cooling air flow produced by the fan passes over the circuit board.

11. The scroll pump as claimed in claim 10, wherein the cowling has an auxiliary opening therethrough spaced from the air outlet and open to the channel in which the circuit board is disposed at a location downstream of the circuit board with respect to the cooling air flow, such that part of the cooling air flow produced by the fan passes over the circuit board and then through the auxiliary outlet.

12. The scroll pump as claimed in claim 1, wherein the cowling defines at least one channel therein extending from the air inlet and to the tunnel that channels the cooling air flow in a direction from the air inlet towards the air outlet thereof, and the exterior of the pump head assembly is exposed to the channel such that the cooling air flow cools the pump head assembly before passing into the tunnel.

13. The scroll pump as claimed in claim 12, further comprising a circuit board having circuitry that controls the operation of the pump, and wherein the circuit board is exposed to the tunnel such that the cooling air flow produced by the fan passes over the circuit board before passing out of the pump through the air outlet.

14. The scroll pump as claimed in claim 1, wherein the cooling fan is disposed in a non-coupled relation to the drive shaft and configured to rotate independently of the drive shaft and the pump motor.

15. The scroll pump as claimed in claim 14, wherein the cooling fan is disposed upstream of the pump head assembly.

16. The scroll pump as claimed in claim 14, comprising a multi-speed or variable-speed fan motor coupled to the cooling fan, a sensor configured for monitoring a load on the pump, and a controller configured for regulating a speed of the cooling fan based on a signal received from the sensor indicative of the load on the pump.

17. The scroll pump as claimed in claim 1, comprising a multi-speed or variable-speed fan motor coupled to the cooling fan, a sensor configured for monitoring a load on the pump, and a controller configured for regulating a speed of the cooling fan based on a signal received from the sensor indicative of the load on the pump.

\* \* \* \* \*